United States Patent [19]

Hatzikelis et al.

[11] 4,372,083
[45] Feb. 8, 1983

[54] PLIABLE EDGE PROTECTOR

[76] Inventors: Christopher Hatzikelis, R.R. 1, Palgrave, Ontario; Ciro Madonia, 1390 Beaufort Dr., Burlington, Ontario; Cesare C. Cosentino, 45 Grandview Ave., Thornhill, Ontario, all of Canada

[21] Appl. No.: 278,589

[22] Filed: Jun. 29, 1981

Related U.S. Application Data

[63] Continuation of Ser. No. 85,294, Oct. 16, 1979, abandoned.

[30] Foreign Application Priority Data

Mar. 26, 1979 [CA] Canada .................................. 324112

[51] Int. Cl.³ .............................................. E05F 7/00
[52] U.S. Cl. .................................................... 49/462
[58] Field of Search ...................... 49/462; 52/716–718

[56] References Cited

U.S. PATENT DOCUMENTS

| | | | |
|---|---|---|---|
| 2,928,201 | 3/1960 | Shanok et al. | 52/716 X |
| 3,547,515 | 12/1970 | Shanok et al. | 49/462 X |
| 3,547,516 | 12/1970 | Shanok et al. | 49/462 X |
| 3,641,707 | 2/1972 | Kellos | 49/462 |
| 3,685,231 | 8/1972 | Blose | 52/716 |
| 3,706,173 | 12/1972 | Taylor | 52/716 |
| 3,837,984 | 9/1974 | Wagner et al. | 52/717 X |

FOREIGN PATENT DOCUMENTS 1044475  9/1966  United Kingdom .................. 52/716

*Primary Examiner*—Philip C. Kannan

[57] ABSTRACT

A pliable edge protector for protecting an automobile door edge from dents and other damage is comprised of an extruded channelar member formed of soft polyvinyl chloride. A decorative strip is bonded to the exterior surface of the channel member, with the edges of the strip extending partly into the throat formed between the spaced-apart flange portions of the channelar member. A bead of hot-melt pressure-sensitive adhesive extends along the length of the interior surface of the bight portion of the channelar member and serves to adhere the edge protector to a door edge inserted into the throat and into contact with the interior surface of the bight portion.

9 Claims, 4 Drawing Figures

PLIABLE EDGE PROTECTOR

This is a continuation of application Ser. No. 085,294, filed Oct. 16, 1979, abandoned.

BACKGROUND OF THE INVENTION

The present invention relates to elongated mouldings for decorating and protecting the bodies of automobiles, boats and for many other applications. In particular, the invention relates to edge protector mouldings for protecting thin projecting edges of car doors, boat hulls, furniture cabinets and the like from damage caused by minor impacts.

Edge protectors of the type to which this invention pertains are channelar or C-shaped in cross-section so as to have an interior groove capable of accommodating the edge of a car door. As is well known, such a car door edge is present along at least the rear or trailing side of a normal car door. When the door is opened, this edge is the most outwardly protruding part of the door and is therefore the part most likely to be dented or otherwise damaged through impact against the body of an adjacent vehicle. Because the edge is strong and thin (e.g. ⅛ inch), it may cause even greater damage to the body of the adjacent vehicle. Such damage can be reduced by fitting an edge protector over the length of the trailing car door edge so that the edge is gripped between the parallel spaced-apart flanges of the edge protector. As will be understood, the edge protector spreads the force of the impact and thereby reduces the incidence of paint chipping, denting and other damage.

One common type of edge protector is formed of an aluminum strip about 15 mils thick which has been coated with a layer of transparent butyrate and folded along its centre line into the desired C-shaped cross-section. A thin coating of pressure-sensitive adhesive is provided on the interior groove surface of the edge protector. One such edge protector is marketed under the trade name "SILVATRIM" by Daymond Limited of Mississauga, Ontario, Canada.

Unfortunately, such prior art edge protectors suffer from a number of disadvantages which limit their acceptance in the marketplace. Perhaps because of the presence of the metallic aluminum strip, it is difficult to cause the prior edge protectors to follow the sharp curvatures present in the edges of many automobile doors. In fact, such prior edge protectors tend, when bent at too sharp an angle, to kink (e.g. to experience an abrupt and often irreversible change in its curvature). Even where the door edge has no sharp curves, the prior art edge protectors are rigid and therefore difficult to fit onto the door edge so as to give an attractive, well-fitted appearance. Moreover, cutting of the prior edge protectors (which must be done at least once for each door edge) tends to distort and twist the aluminum strip to leave an unsightly protector end. Generally, the inclusion of an aluminum strip in prior edge protectors has been unsatisfactory.

It is therefore a principal object of the present invention to provide an edge protector which is pliable and can be easily installed without kinking on almost all car door edges.

It is a further object to provide an edge protector which does not utilize a metallic strip and which can be cut easily to leave a neat and undistorted end.

It is a further object of the invention to provide a pliable edge protector which is sufficiently pliable, at a normal ambient room temperature of 70° F., to be bent without kinking into a circle having a diameter of less than three inches.

SUMMARY OF THE INVENTION

To achieve the foregoing and other unstated objects and advantages, the present invention broadly provides a pliable edge protector comprising:

(a) an elongated extruded channelar member formed of pliable material, said extruded channelar member having a bight portion and a pair of spaced-apart flange portions projecting therefrom to form an interior throat therebetween;

(b) a decorative elongated strip of thin material, said decorative elongated strip having two major surfaces and two minor edge surfaces extending along the length of the decorative strip, one of said major surfaces covering the exterior surface of said extruded channelar member and extending over the projecting ends of said flange portions to thereby dispose said minor edge surfaces within said interior throat; and (c) adhesive means disposed on the interior surface of said channelar member, said adhesive means being adapted to adhere to an edge inserted through the throat and into contact with said bight portion.

According to a preferred embodiment, the pliable material is a soft polyvinyl chloride. Preferably the decorative elongated strip comprises a film of polyvinyl chloride having (i) a decorative coating on the other of the aforesaid two major surfaces thereof, and (ii) a film of transparent weather-resistant material disposed over the decorative coating and over the aforesaid other of the two major surfaces.

INTRODUCTION OF THE DRAWINGS

For a better understanding of the invention and its advantages, reference may be made to the following detailed description, taken in conjunction with the accompanying drawings, wherein.

DETAILED DESCRIPTION

Figure 1:
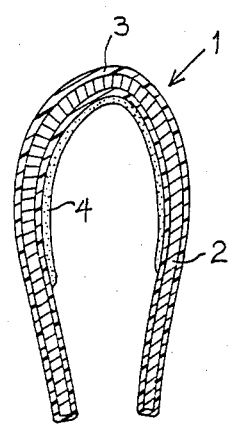
FIG. 1 is a lateral cross-sectional view of a prior art edge protector.

FIG. 1 shows a lateral cross-section of a prior art edge protector 1 of the type sold under the trade name "SILVATRIM" by Daymond Limited.

Edge protector 1 is formed of an elongated aluminum strip 2 of about 15 mil thickness which has been coated on both sides with a layer 3 of transparent butyrate and folded along its centre line into the desired C-shaped cross-section. A thin coating 4 of pressure-sensitive adhesive is provided on the interior groove surface of edge protector 1.

As noted hereinabove, this type of edge protector is not pliable enough to permit easy installation on most door edges. This difficulty, and the kinking which often occurs when fitting edge protector 1 over sharply curving edges, are believed to be caused by the presence of aluminum strip 2.

Figure 2:
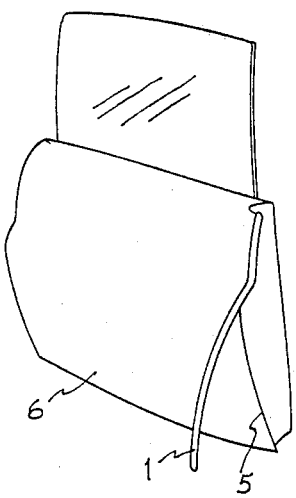
FIG. 2 is a perspective view of a car door showing an edge protector partially applied to the edge thereof.

FIG. 2 shows the installation of edge protector 1 over the edge 5 of car door 6. As can be seen, edge protector 1 has been successfully fitted onto the first curve of edge 5 and is about to be fitted onto the second curve of edge 5, which is likely to involve difficulty and perhaps kinking as well.

Figure 3:
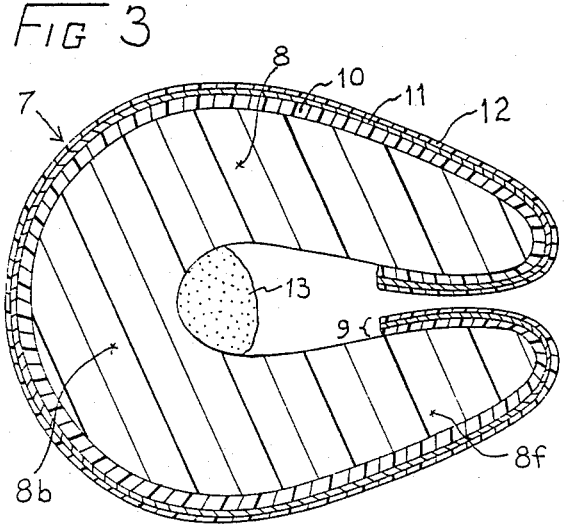
FIG. 3 is a lateral cross-sectional view of a pliable edge protector in accordance with one embodiment of the present invention.

FIG. 3 shows a lateral cross-section of a pliable edge protector 7 in accordance with a preferred embodiment of the present invention. In brief, edge protector 7 comprises an elongated extruded channelar member 8 formed of pliable material, a decorative elongated strip 9 of thin material, and adhesive means 13 on the interior surface of channelar member 8.

More particularly, channelar member 8 has a bight portion 8b and a pair of spaced-apart flange portions 8f projecting from bight portion 8b to form an interior throat between flange portions 8f. Advantageously, channelar member 8 is formed of a polyvinyl chloride material which is sufficiently soft to lend the desired pliability to edge protector 7. One such polyvinyl chloride material is sold under the trade mark "GEON" 9001 by the B. F. Goodrich Chemical Company.

Decorative elongated strip 9 has two major surfaces and two minor edge surfaces extending along the length of the decorative strip. One of the major surfaces of strip 9 covers the exterior surface of bight portion 8b and flange portions 8f of channelar member 8 and extends over the projecting ends of flange portions 8f to thereby dispose the minor edge surfaces of strip 9 within the interior throat (formed between flanged portions 8f) of channelar member 8.

As illustrated in FIG. 3, decorative strip 9 comprises a film 10 of polyvinyl chloride having the aforesaid one of its major surfaces bonded (by adhesives, heat, or other means) to the exterior surface of channelar member 8. A thin decorative coating 11, preferably of evaporated aluminum or the like, is deposited on the other major surface of film 10. Finally, a transparent film 12 of polyester or other transparent weather-resistant material is disposed over decorative coating 11 and over the aforesaid other major surface of film 10. Such a strip 9 is sold under trade name such as "TEDLAR" in North America.

Adhesive means 13 preferably comprises a bead of hot-melt pressure-sensitive adhesive which extends along the length of the interior surface of bight portion 8b. This type of adhesive advantageously remains sticky even after extended periods of storage of edge protector 7, and will still adhere to the length of an edge inserted between flange portions 8f and into contact with the interior surface of bight portion 8b and with adhesive means or bead 13.

Figure 4:
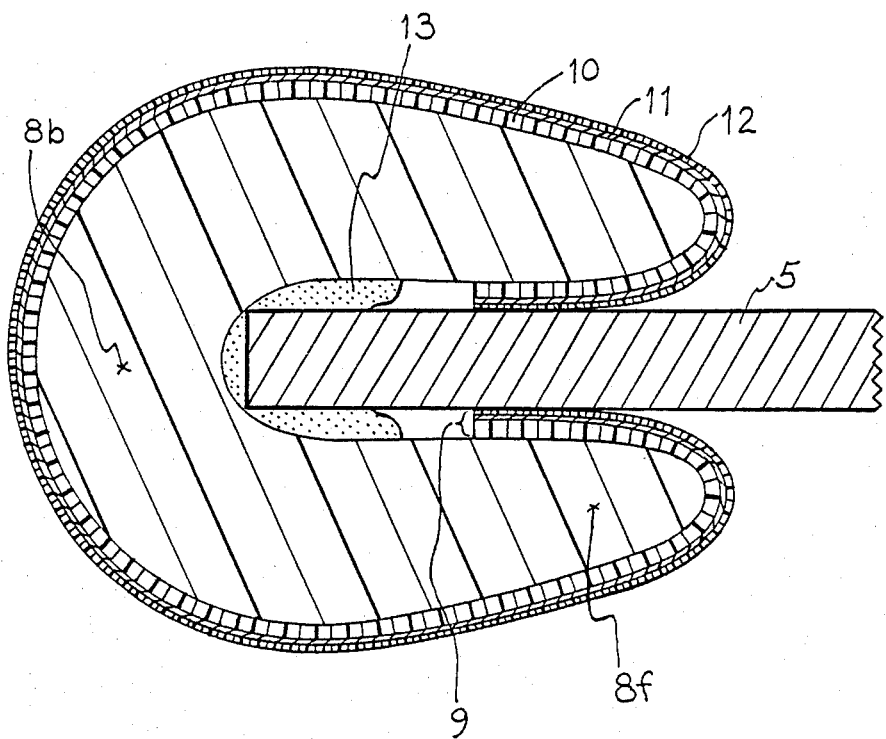
FIG. 4 is a lateral cross-sectional view of the pliable edge protector of FIG. 3, showing an edge inserted into the interior groove thereof.

While the aluminum decorative coating 11 is subject to weathering and undesirable discolouration along the minor edge surfaces of strip 9, these minor edge surfaces are advantageously well-protected from weathering once the edge protector is fitted over an edge 5, as shown in FIG. 4. As can be seen, edge 5 is inserted into the interior throat between flange portions 8f and into contact with the interior surface of bight portion 8b, thereby both sealing the minor edge surfaces of strip 9 within edge protector 7 and also preventing strip 9 from peeling away or delaminating from channelar member 8.

In addition to the latter advantages, and perhaps more importantly, edge protector 7 is sufficiently pliable to be bent without kinking into a circle having a diameter of less than three inches, at an ambient temperature of 70° F. In fact, sample lengths of the novel edge protector 7 have been bent into circles of less than two inch diameters, without noticeable kinking. This degree of pliability allows the novel edge protectors 7 to be installed easily even on door edges which have sharp curves.

Moreover, perhaps because of the absence of a metallic strip, edge protector 7 can be cut easily with a knife or pair of garden snippers to leave a neat and undistorted end.

The invention has been described with reference to the preferred embodiments shown in the drawings. Obvious modifications and changes will suggest themselves to those having ordinary skill, and it is intended that these modifications and changes be encompassed by the invention insofar as they come within the scope of the appended claims.

What is claimed is:

1. A pliable edge protector comprising;
   (a) an elongated extruded homogeneous channelar member formed solely of plastic pliable material, said member having a bight portion and a pair of opposed flange portions extending therefrom in mutually convergent relation to form a restricted entry suitable in use to receive an automobile door edge in readily penetrating relation therebetween;
   (b) a decorative film comprising a pliable film strip having a major surface thereof bonded in adhering relation to the outer surface of said channelar member, a solely decorative metallic film deposited on the exterior of said film strip; and a weather resistant film deposited on the exterior surface of said metallic film in overlying protective relation therewith and extending within said said entry to locate the edges of said metallic film in protected, non-exposed relation between said flange portions, and
   (c) a bead of pressure sensitive adhesive disposed within said bight portion and protected prior to assembly with said edge soley by said flange portions to provide substantially non-kinking, substantially non-degradable pliable protector.

2. The edge protector as claimed in claim 1, said adhesive bead extending continuously for the length of said channelar member.

3. The edge protector as claimed in claim 1, said edge protector being sufficiently pliable to be bent without kinking into a circle having a diameter less than three inches at an ambient temperature of 70° F.

4. The edge protector as claimed in claim 1, said member being a soft polyvinyl chloride.

5. The edge protector as claimed in claim 4, said adhesive bead extending continuously for the length of said channelar member.

6. The edge protector as claimed in claim 1, said decorative film having a polyvinyl chloride tape and a transparent weather-resistant material in sandwiching relation with an aluminum decorative coating.

7. The edge protector as claimed in claim 6, said adhesive bead extending continuously for the length of said channelar member.

8. The edge protector as claimed in claim 6, said edge protector being sufficiently pliable to be bent without kinking into a circle having a diameter less than three inches at an ambient temperature of 70° F.

9. The edge protector as claimed in claim 8, said circle having a diameter no greater than two inches.

* * * * *